United States Patent
Stevenson

(10) Patent No.: US 6,499,891 B1
(45) Date of Patent: Dec. 31, 2002

(54) RAPID CABLE-SPLICE FOR HIGH-TENSILE APPLICATIONS

(75) Inventor: Willard Stevenson, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/945,201

(22) Filed: Aug. 30, 2001

(51) Int. Cl.[7] .............................. G02B 6/38; G02B 6/255
(52) U.S. Cl. ............................................. 385/99; 385/95
(58) Field of Search .............................. 385/99, 95, 96, 385/97, 98

(56) References Cited

U.S. PATENT DOCUMENTS

| | | | |
|---|---|---|---|
| 4,509,820 A | 4/1985 | Murata et al. | 350/96.21 |
| 4,846,545 A | 7/1989 | Estabrook et al. | 350/96.21 |
| 4,923,268 A | 5/1990 | Xu | 350/96.15 |
| 5,081,695 A | 1/1992 | Gould | 385/107 |
| 5,201,019 A | 4/1993 | Gallusser | 385/99 |
| 5,261,018 A | 11/1993 | Suganuma et al. | 385/51 |
| 5,592,579 A | 1/1997 | Cowen et al. | 385/99 |
| 5,642,451 A | 6/1997 | Kennedy et al. | 385/99 |
| 5,731,051 A | 3/1998 | Fahey et al. | 428/34.9 |
| 5,832,162 A | 11/1998 | Sarbell | 385/99 |

*Primary Examiner*—Brian Sircus
*Assistant Examiner*—Michael C. Zarroli
(74) *Attorney, Agent, or Firm*—Peter A. Lipovsky; Jim A. Ward; Andrew J. Cameron

(57) ABSTRACT

A fiber optic cable splice places a hot-melt adhesive tube over fused fibers, bare buffer, bare strength member and part of the protective jacket of each cable joined. A heat shrink tube is disposed over the hot-melt tube and an elongated strengthening rod is inserted between these tubes, extending longitudinally for equal lengths beyond the tubes. The hot-melt adhesive tube and heat shrink tube are heated to seal the hot-melt adhesive around the fused fibers, bare buffer, bare strength member and portions of the outer protective jacket of each cable and to shrink the heat shrink tube to bind the rod to the hot-melt tube and its enclosed contents. The cable is helically wound around the lengths of the rod extending beyond the inner tubes and an outer heat shrink tube is shrunk to bind the rod to the joined cable, the inner heat shrink tube and its enclosed contents.

8 Claims, 2 Drawing Sheets

RAPID CABLE-SPLICE FOR HIGH-TENSILE APPLICATIONS

BACKGROUND OF THE INVENTION

This invention relates generally to the field of fiber optics and more particularly, but without limitation thereto, to a technique for rapidly joining fiber optic cable expected to undergo significant tensile loadings.

Land-locked fiber cable settings seldom encounter the need for a rapidly performed cable splicing wherein the splice is capable of significant tensile loadings. While some land-based cable is strung from overhead telephone poles and the like, posing possible tension on these lines, it is much more typical for the lines to run underground or elsewhere in supporting conduits. The sealing effect of such a splice needs only to resist common moisture or occasional flooding.

In the underwater environment, cable conditions can be much more trying. Besides having to deal with some-times extreme hydrostatic pressures, there are also tensile stresses that occur during the laying of these cables and their repair. In addition to the weight of the cable from ship to ocean floor, there are concerns of drag on the cable as it is payed-out from a dispensing ship.

Autonomous vehicles have made it possible to repair a great many fiber optic cables laid on the ocean floor. The vehicles are used to retrieve the faulty cable and bring it to the surface where a new span or length of cable can be spliced into place. In such repair scenarios time can be of the essence for some obvious and not so obvious reasons. Sea-state can wreak havoc with positioning a repair vessel. The rise and fall of the vessel can add and detract from the tension placed upon the cable. Further, prolonged suspension of the cable in the water column during repair is usually something to be minimized.

Because of sea condition, it is desirable to provide a cable splice that can be executed promptly, that ensures adequate sealing, and that withstands acceptable tensile stresses without self-destructing.

A great many designs for underwater cable splices exist as fiber optics are now extensively employed in the world's waters. Typically these involve potting compounds that require time to cure. Many such splices incorporate numerous parts and complicated procedures, lengthening the time to complete the splice.

In U.S. Pat. No. 4,846,545, two examples of cable splice designs are illustrated. Shown in FIGS. 1 and 2 of this patent, respectively, are a bulky/rigid connector and a much more flexible connector. The bulky connector has many parts that must be precisely assembled. The flexible connector requires that mechanical strength members be swaged together. In either case, these methods add complexity to the splicing procedure and thereby lengthen the time for the splicing to be made.

For all such splices, their optical as well as mechanical attributes are considered important. These are characteristics that frequently are traded-off in the sense that mechanical strength is provided at the expense of optical quality or that optical losses are minimized at the expense of mechanics.

There is thus a need for a fiber optic cable splice that provides excellent optical and mechanical properties without unreasonably sacrificing one or the other. When such a splice is used in maritime environments, it is desirable that the splice be executed in a prompt and efficient manner.

SUMMARY OF THE INVENTION

The invention provides a technique for joining fiber optic cables that can be rapidly executed and that provides desirable optical and mechanical properties. An example of the invention can be used with a fiber optic cable containing a radially inner optical fiber, a buffer section radially surrounding the fiber, a strength member section radially surrounding the buffer section and an outer protective jacket radially surrounding the strength member.

This technique includes the steps of:

stripping each fiber optic cable to terminate in a length of bare optical fiber, followed by a length of the cable where the buffer section is made bare, followed by a length of the cable wherein the strength member is made bare;

fusion splicing the bare optical fibers;

disposing a hot-melt adhesive tube over the bare fused fibers, the bare buffer lengths, the bare strength member lengths and a portion of the outer protective jacket of each cable;

disposing an inner heat shrink tube over the hot-melt tube;

inserting an elongated strengthening rod between the hot-melt adhesive tube and the inner heat shrink tube, the rod extending longitudinally for substantially equal lengths beyond these tubes;

exposing the hot-melt adhesive tube, the rod and the inner heat shrink tube to heat wherein the hot-melt adhesive tube shrinks and seals around the fused fibers, bare buffer lengths, bare strength member lengths and the portions of the outer protective jacket of each cable and wherein said inner heat shrink tube shrinks to bind the rod to the hot-melt adhesive tube and its enclosed contents;

helically winding the cable around the lengths of the rod that extend beyond the hot-melt adhesive and heat shrink tubes;

disposing an outer heat shrink tube over the elongated strengthening rod; and exposing the outer heat shrink tube to heat so as to bind the rod to the cable, the inner heat shrink tube and its enclosed contents.

Other objects, advantages and new features of the invention will become apparent from the following detailed description of the invention when considered in conjunction with the accompanied drawings.

DESCRIPTION OF THE INVENTION

Figure 1:
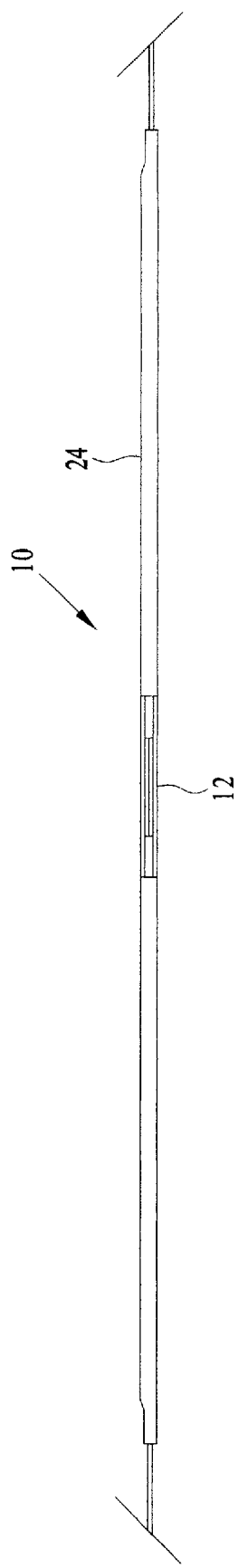
FIG. 1 is a lateral, partial side-section, view of an apparatus for joining the ends of two fiber optic cables according to the invention.

Referring to FIG. 1, a fiber optic cable splice 10 according to the invention is shown by way of example. Splice 10 includes a substantially center section 12 shown in greater detail in FIG. 2.

Figure 2:
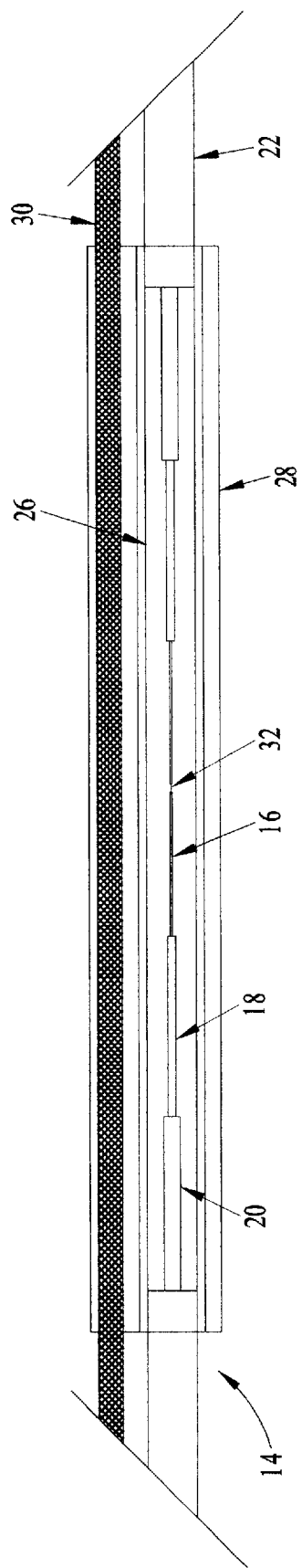
FIG. 2 is a detailed section view of an exemplary fiber cable splice according to the invention wherein an outer heat shrink tube has been removed for clarity.

Referring now to FIG. 2, a fiber optic cable 14 as may be used with the invention includes an inner optical fiber 16, a buffer section 18 radially surrounding fiber 16, a strength member section 20 radially surrounding buffer 18 and finally a outer protective jacket 22 radially surrounding strength member section 20.

A commercially available example of this cable is the Berk-Tek (trademark) 3HT1G01. This 0.06 inch diameter cable is described as a nylon jacketed cable with a hermetic coated, dispersion shifted, 250 micron buffered fiber centrally located within six parallel laid music wires, each being 0.011 inches in diameter and serving to strengthen the cable. The cable has a break strength of 273 pounds, a working strength of 60 pounds (0.3% strain); a specific gravity of 2.3; and a weight in air of 2.85 pounds/1000 feet.

This example is described in order to aid one of ordinary skill in the art of the invention to make and use the same. It is not offered to imply that other brands and types of cables cannot be used to carry out the invention. The other brands and types of cables should only be limited by the scope of the claims attached to this specification.

Referring again to FIG. 2, the process of the invention includes stripping the cable ends so that a bare section of the fiber is produced followed by a bare section of the buffer, a bare section of the strength member and ending with the outer jacket. For the cable described above, the length of these stripped sections was ⅜ of an inch each. Preferably, before fusing, an outer heat shrink tubing 24 shown in FIG. 1, but removed from FIG. 2 for clarity, is slid along the right side cable. For the cable described above, suitable tubing is made by Sumitomo (trademark) and is described as their W3B2 tubing having a ⅛ inch internal diameter. This tubing is of polyethylene. A tube section 19 inches long was found to be suitable for the example cable described. It is also preferable, before fiber splicing, to slide a splice protection sleeve over the left side cable. In this instance, the protection sleeve is made of an inner hot-melt adhesive tube 26 and a heat shrink tube 28 surrounding tube 26. Tubes 26 and 28 can be assembled from a commercially available sleeve manufactured by Sumitomo (trademark) as the Sumitomo FPS 1, however the support split of the sleeve is removed and replaced with an 18 inch ¹⁄₁₆ inch diameter steel welding rod 30. The hot-melt tube of this manufacture is of ethylene vinyl acetate wherein the heat shrink tube 28 is of polyethylene.

The fibers are then fusion spliced, such as in a conventional way through the use of a York (trademark) cleaver and Ericsson (trademark) fusion splicer.

The protection sleeve made of tubes 26, 28 and support rod 30 is placed substantially centrally over fusion joint 32 so as to cover the joint, bare fibers 16, buffer sections 18, strength member sections 20 and a portion of outer protective jacket 14 of each cable. Heat is then applied, such as via a heat gun, to shrink the protection sleeve preferably from the center out. The heat shrinks the protection sleeve around the optically coupled fibers.

Figure 3:
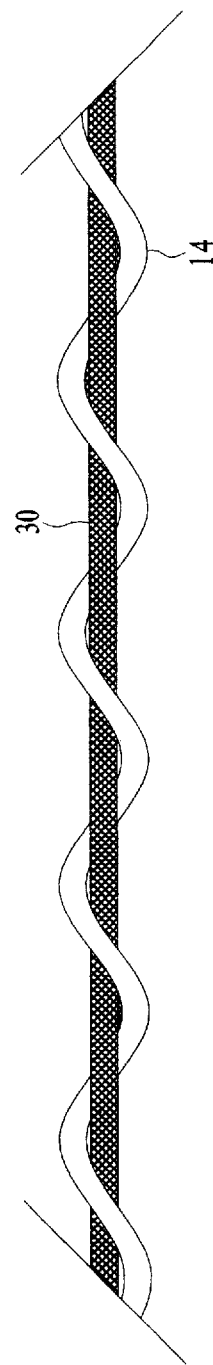
FIG. 3 is a detailed side view of an outer-laying portion of the fiber cable splice of the invention wherein an outer heat shrink tube has been removed for clarity.

Cables 14 outlying the protection sleeve are then helically wound around rod 30 as is shown in FIG. 3. Outer heat shrink tubing 24, shown in FIG. 1, is then slid into place to completely cover rod 30. Heat shrink tubing 24 is then shrunk, preferably from its center out, by application of heat such as supplied by a conventional heat gun.

To ensure that the splice of the invention satisfied technical requirements, rigid testing was undertaken. In this test, a total of 13 splices were fabricated to validate design specifications. All the cable used in the development of the splice was recovered after several months on the seafloor. This cable was chosen to more closely resembled cable that was damaged underwater versus the use of new cable. In most cases the ends of two long lengths of cable were spliced together to allow splice loss measurements by an optical time domain reflectometer (OTDR). Table I summarizes the test results with a discussion of the results following.

TABLE I

Summary of Tests

| Splice # | Estimated loss (db) | Loss (db) by OTDR | Time to do (min) | Proof load (lb) | Break load (lb) | Pressure test (P/F) | Temp test (P/F) |
|---|---|---|---|---|---|---|---|
| 1 | 0.02 | 0.60 | — | 50 | — | pass | pass |
| 2 | — | — | — | 50 | 70 | — | — |
| 3 | — | — | 19 | 30 | 30 | — | — |
| 4 | — | 2.14 | 20 | 100 | — | — | — |
| 5 | 0.02 | 0.22 | 17 | 50 | 98 | — | — |
| 6 | — | 0.10 | 21 | 50 | 50 | — | — |
| 7 | 0.05 | 0.11 | 18 | — | — | — | — |
| 8 | — | — | 20 | 50 | 50 | — | — |
| 9 | 0.10 | 0.18 | 19 | 55 | — | pass | pass |
| 10 | 0.03 | <0.50 | 15 | 50 | 85 | — | — |
| 11 | — | <0.50 | <30 | — | — | — | — |
| 12 | 0.10 | 0.38 | 19 | — | — | pass | pass |
| 13 | 0.04 | 0.11 | 15 | — | — | — | — |

Estimated loss refers to the value established by the Ericsson (trademark) fusion splicing machine. This was an analysis of the fused fiber based on geometry and not on light passing through the joint. This was typically used as a first check on the integrity of the splice. If this value fell below 0.50 db, the joint was usually considered sufficient. The figure also does not include any added loss which may arise during the completion of the cable splice. A dash (–) in the table indicates the test was not performed or data not taken.

The OTDR was used to measure the loss after the joint was completed and during stress tests. The measurements were all performed using 1550 nanometer light. Except for the first prototype, all the splices were performed on the outside ends of two reels of cable recovered from a sea test. The inside ends were connectorized with FC pigtails making connection to the OTDR quick and simple. Samples 10 and 11 were made from cable samples that had significant attenuation differences, and this measurement was not consistent, however based on two point measurements the loss was determined to be less than 0.50 db, the maximum loss acceptable.

The time to complete the splice was recorded and in general included the preparation of two cable ends, however, in practice one end (the replacement cable) can be prepared before cable recovery begins. This time also includes removal of any cable pack adhesive which was evident on the cable used for this development. For sample #11 the assembly process was interrupted by unrelated events but still completed in less than 30 minutes.

Most of the samples were proof-tested to evaluate the mechanical integrity of the joint. In this regard, the spliced section was placed between a static mandrel and 12 inch diameter traveling sheave around which the cable was routed. The cable on either end of the joint was wrapped several turns around the mandrel and clamped in place. The sheave was then pulled away from the mandrel at a low speed until the desired tension (proof load) was reached. The tension could have been maintained indefinitely but in general was a short duration load. Continuity or splice loss was monitored during the test. Tension was measured using a load cell and the output visually read from a meter.

Several samples were pulled to failure (break load) using the same fixture. The load was applied gradually so the tension could be visually monitored and recorded when optical continuity was lost. The values recorded indicate the load at which the fiber breaks.

Pressure tests on the splices were performed using a 6 foot long chamber with an inside diameter of 2.75 inches. The splice was placed inside the chamber with the cable ends penetrating the same chamber endcap. The ends were then epoxied in place, similar to that of a stuffing tube. Fresh water was allowed to fill the chamber and the chamber was pressurized to 1600 psi. The OTDR was used to measure splice loss. In general the temperature of the water was about 23° C., but in two cases the water temperature was modified. Water heater water was used to provide an extreme upper temperature (33° C.) and a slurry of ice and saltwater was used for the cold pressure test (−2° C.).

The first prototype was fabricated to evaluate the design for strength. The splice was proof tested to 50 pounds while continuity of the fiber was verified with a visible light source. This joint was made with short samples of cable precluding the use of OTDR for loss measurement. In order to evaluate the optical response to hydrostatic pressure and extreme temperature, two long lengths of fiber were spliced onto the ends, therefore the splice loss measurements include two splices outside the chamber. The combined loss as measured by the OTDR was 0.60 db and did not significantly change under 1600 psi. Pressure was held for 20 minutes and then released. The sample was then placed in a standard freezer at −11° C. for 3 hours and showed no degradation. It was then placed into the oven at 47° C. for 2 hours, again no change. This sample was partially dissected and found to be dry under the shrink tubing.

The second splice was fabricated to test to failure in tension. It was first proof tested to 50 pounds with optical continuity verified. Tension was increased to 110 lb without failure then reduced to 45 lb and left at load for 24 hours at approximately 27° C. and 90% relative humidity. The following day it was still continuous but pulled to failure at 70 lb. The bond between the cable jacket and the outer shrink tube gave out.

The next splice was assembled without the steel rod and pulled to break at only 30 pounds. This verified the need for this strengthening element.

The fourth sample was primarily a mechanical joint intended to be abused. The fibers were manually fused and there was no attempt to produce a low loss splice, however during tests an OTDR was used to evaluate any changes to the loss. The splice was pulled in straight tension to 100 pounds then placed around a 6 inch diameter sheave and pulled to 50 pounds with no excess loss. A quick and dirty torque test was conducted next. Nine inches from the each end of the shrink tube the cable was fixed in two vises under slight tension. The center of the splice was grabbed and rotated four times or 1440 degrees with no change in optical loss.

The next four samples (5–8) were fabricated with 12 inch steel rods and 13 inch shrink tubes in an attempt to shorten the assembly time. The results were that assembly time was not reduced, and the break strength seemed to be reduced consistently. The failure mode was always the cable's outer protective jacket slipping over the steel music-wire strength members. To increase the shear transfer from the wires to the jacket (and subsequently to the steel reenforcing rod), the cable was helically twisted around the rod before shrinking down the outer shrink tube. Bench tests showed an increase in tension required to strip or otherwise slip the cable's jacket when helixed, but the splice test results showed little improvement and hence the 12 inch splice design was abandoned. The splice loss, time-to-complete and proof test data were still valid.

Beginning with sample #9 the shrink tube used was Sumitomo W3B2, previously a Raychem product was used. This sample was proof tested to 55 pounds and held for 70 hours with no change in optical loss (0.18 db @ 1550 nm). It was then pressurized to 1600 psi for 68 hours with no changes. A low temperature pressure test was designed to combine stresses on the joint. Two cups of rock salt were mixed with 7 pounds of crushed ice and some water. The temperature was measured at −2° C. This slurry was poured into the pressure vessel and pumped up to 1600 psi and held for 30 minutes. There was never any fluctuation of the optical loss at the splice. The joint was dissected and found dry.

Sample #10 was used for loss, time and break strength tests, whereas #11 was fabricated for sink rate tests. The #11 splice was suspended above the center of a test pool with the cable reaching to each end of the pool. After supplying some slack, the cable and splice were dropped and the time to reach the bottom noted. The sink rate was determined to be about 1 foot per second. It appeared that the splice sank at the same rate as the cable, at least it did not lag or lead the cable in reaching the bottom of the 38 foot pool.

A warm water pressure test was completed on sample #12. A hot water line was run to the pressure vessel and water circulated through the system for several minutes to warm it up. The temperature of the water was 33° C., and no optical changes were noted when the pressure was increased to 1600 psi. The splice was left pressurized over 48 hours and still no changes occurred.

Finally, the last splice sample was fabricated from a cable retrieved from the seafloor (200 meters water depth) and was spliced to a 2.5 km cable pack. After completing the joint, it was passed over-board and about 360 meters of cable was paid-out of the pack. The cable was then cut and allowed to drop to the seafloor. Later that day the cable was retrieved with the splice intact and no excess loss was measured.

An advantage of the design of the invention is the speed at which the cable splice can be produced. The splice contains relatively few parts and has no epoxies to cure. The finished product is lightweight and flexible and can transmit tensile loads that exceed the safe working load of the cable.

Although the splice works well with the specific cable design described above, it is applicable to a wide range of cables, including fiberglass reenforced cables and cables using steel tube strength members. Different cable diameters and jacket styles can be accommodated with modifications to the size of the components described by way of example. The steel reenforcement rod can be replaced with a dielectric strength member. The total length of the splice can of course also be altered depending upon desired tensile load.

Obviously, many modifications and variations of the invention are possible in light of the above description. It is therefore to be understood that within the scope of the claims the invention may be practiced otherwise than as has been specifically described.

What is claimed is:

1. An apparatus for joining ends of fiber optic cable, each cable having a radially inner optical fiber joined to the other at an optical coupling, a buffer section radially surrounding said fiber, a strength member section radially surrounding said buffer section and an outer protective jacket radially surrounding said strength member section, wherein said optical fiber of each fiber optic cable is made bare in an area adjacent said optical coupling, followed by an area of each cable wherein said buffer section is made bare, followed by an area of each cable wherein said strength member section is made bare, the apparatus comprising:

a hot-melt adhesive tube, said tube disposed to directly cover said bare fiber, said bare buffer section, said bare strength member section and a portion of said outer protective jacket of each cable;

an inner heat shrink tube disposed to cover said hot-melt tube;

an elongated strengthening rod disposed between said hot-melt adhesive tube and said inner heat shrink tube and extending longitudinally for substantially equal lengths beyond said tubes wherein said cable is wound about said lengths of said rod; and an outer heat shrink tube disposed to cover said cable ends, said hot-melt adhesive tube, said inner heat shrink tube and said elongated strengthening rod.

2. The apparatus of claim 1 wherein said elongated strengthening rod has a diameter substantially equal to the diameter of said cable.

3. The apparatus of claim 2 wherein said elongated strength member is stainless steel.

4. The Apparatus of claim 1 wherein said strength member is of a dielectric material.

5. The apparatus of claim 3 wherein said hot-melt adhesive tube is of ethylene vinyl acetate.

6. The apparatus of claim 5 wherein said inner and outer heat shrink tubes are of polyethylene.

7. An apparatus for joining ends of fiber optic cable, each cable having a radially inner optical fiber joined to the other at an optical coupling, a buffer section radially surrounding said fiber, a strength member section radially surrounding said buffer section and an outer protective jacket radially surrounding said strength member section, wherein said optical fiber of each fiber optic cable is made bare in an area adjacent said optical coupling, followed by an area of each cable wherein said buffer section is made bare, followed by an area of each cable wherein said strength member section is made bare, the apparatus comprising:

a hot-melt adhesive ethylene vinyl acetate tube, said tube disposed to directly cover said bare fiber, said bare buffer section, said bare strength member section and a portion of said outer protective jacket of each cable;

an inner heat shrink polyethylene tube disposed to cover said hot-melt tube;

an elongated stainless steel strengthening rod disposed between said hot-melt adhesive tube and said inner heat shrink tube and extending longitudinally for substantially equal lengths beyond said tubes wherein said cable is helically wound about said lengths of said rod, said stainless steel rod having a diameter substantially equal to the diameter of said cable and extending at least 100 times the diameter of said cable on either side of said hot-melt adhesive and inner heat shrink tubes; and an outer heat shrink polyethylene tube disposed to cover said cable ends, said hot-melt adhesive tube, said inner heat shrink tube and said elongated strengthening rod.

8. A method for joining ends of fiber optic cable wherein each contains a radially inner optical fiber, a buffer section radially surrounding said fiber, a strength member section radially surrounding said buffer section and an outer protective jacket radially surrounding said strength member section, the method comprising the steps of:

stripping each fiber optic cable to terminate in a length of bare optical fiber, followed by a length of said cable wherein said buffer is made bare, followed by a length of said cable wherein said strength member section is made bare;

fusion splicing said bare optical fibers;

disposing a hot-melt adhesive tube over said bare fused fibers, said bare buffer lengths, said bare strength member lengths and a portion of said outer protective jacket of each cable;

disposing an inner heat shrink tube over said hot-melt tube;

inserting an elongated strengthening rod between said hot-melt adhesive tube and said inner heat shrink tube, said rod extending longitudinally for substantially equal lengths beyond said tubes;

exposing said hot-melt adhesive tube, said rod and said inner heat shrink tube to heat wherein said hot-melt adhesive tube shrinks and seals around said fused fibers, bare buffer lengths, bare strength member lengths and said portions of said outer protective jacket of each cable and wherein said inner heat shrink tube shrinks to bind said rod to said hot-melt adhesive tube and its enclosed contents;

helically winding said cable around said lengths of said rod that extend beyond said hot-melt adhesive and inner heat shrink tubes;

disposing an outer heat shrink tube over said elongated strengthening rod; and exposing said outer heat shrink tube to heat so as to bind said rod to said cable, said inner heat shrink tube and its enclosed contents.

* * * * *